Oct. 10, 1939.  F. MADDEN  2,175,965
STEERING GEAR FOR TRACTORS
Filed March 2, 1939   2 Sheets-Sheet 1
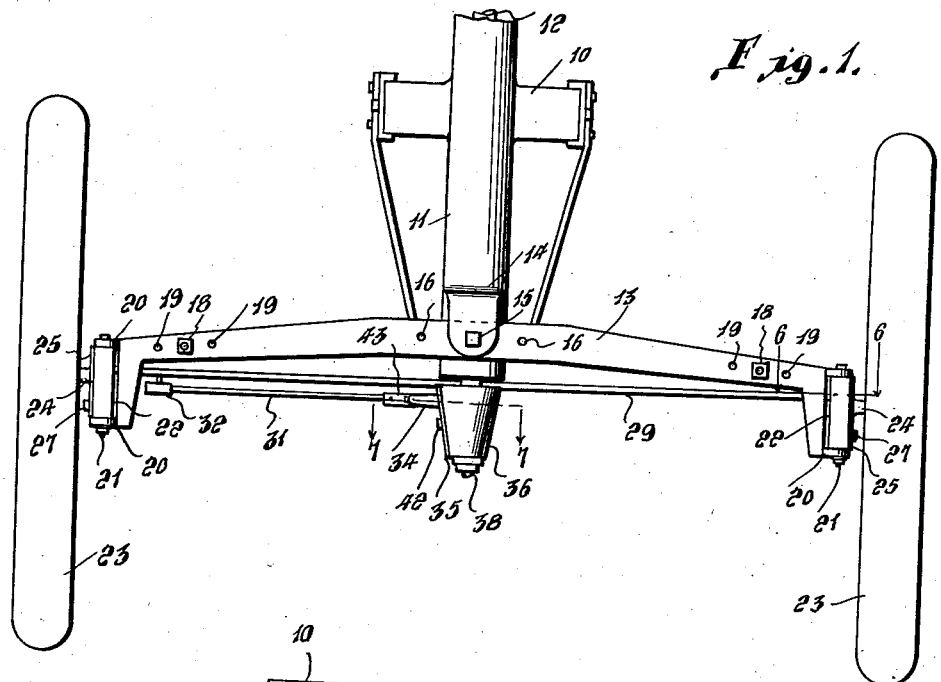
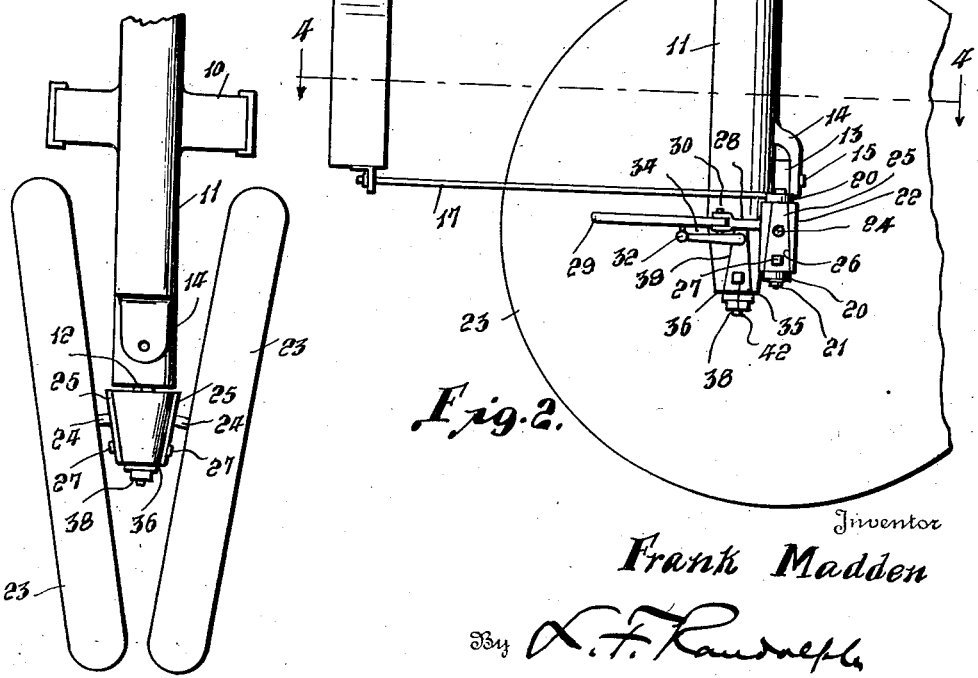
Inventor
Frank Madden Oct. 10, 1939.  F. MADDEN  2,175,965
STEERING GEAR FOR TRACTORS
Filed March 2, 1939  2 Sheets-Sheet 2
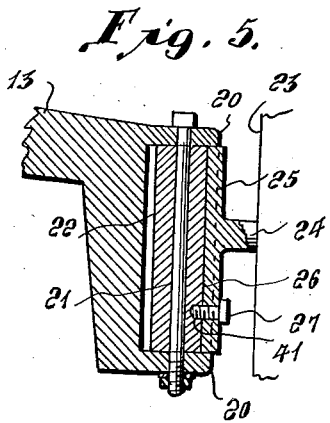
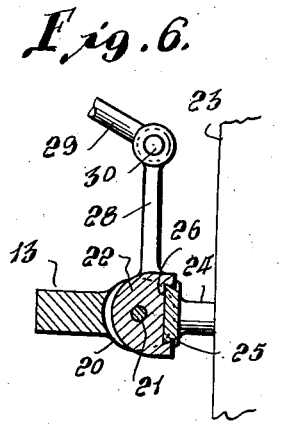
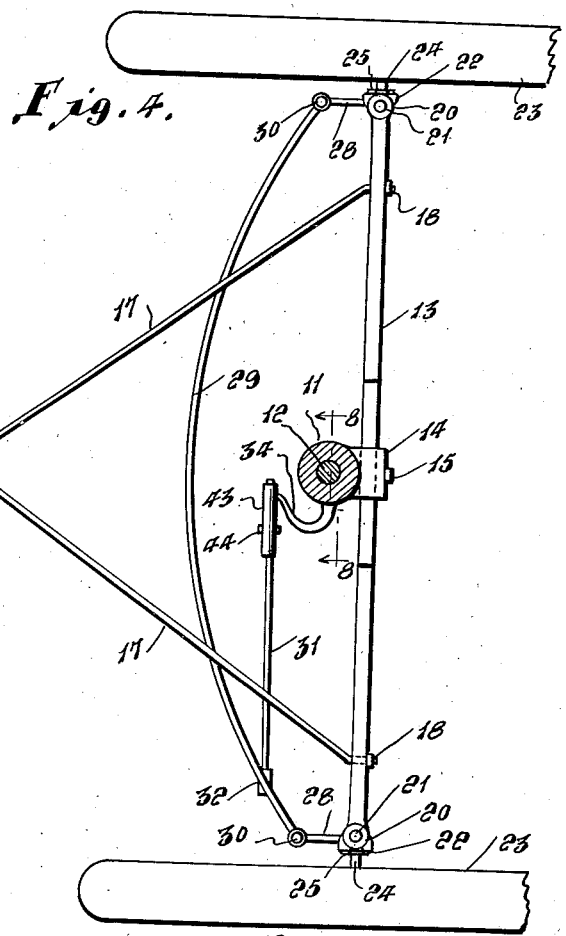
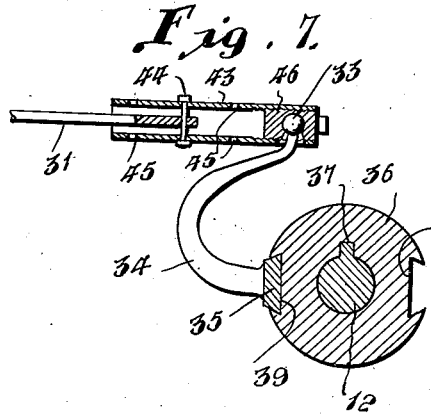
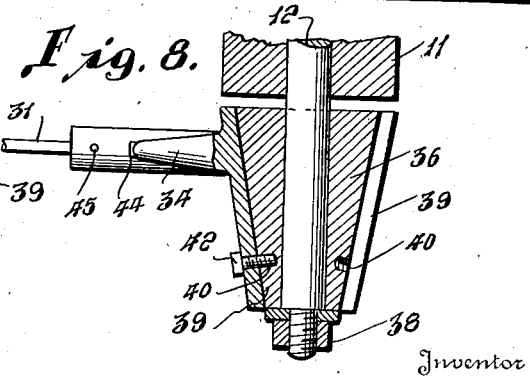
Inventor
Frank Madden
By L. F. Randolph
Attorney Patented Oct. 10, 1939

2,175,965

UNITED STATES PATENT OFFICE 2,175,965

STEERING GEAR FOR TRACTORS

Frank Madden, Earlville, Ill.

Application March 2, 1939, Serial No. 259,429

5 Claims. (Cl. 280—87)

This invention relates to a steering gear for tractors and it aims to provide a construction permitting adjustment or variation in the position of the wheels according to different conditions of use, so that operation will be easier, especially when plowing, enabling the wheels to be practically self-steering in the furrow.

It is further aimed to provide such a construction wherein the wheels may be disposed relatively close together in downwardly diverging relation or arranged farther apart and optionally and expeditiously, and further to provide a structure wherein the mounting axle and associated parts may be adjusted to conditions eccentric with the longitudinal axis of the tractor.

The more specific objects and advantages will become apparent from a consideration of the description following taken in connection with the accompanying drawings illustrating an operative embodiment.

In said drawings:

Figure 1 is a view in front elevation showing steering gear embodying my improvements, Figure 2 is a side elevation of the parts of Figure 1, Figure 3 is a view in front elevation showing the wheels of Figure 1 adjusted to a different position from that figure, Figure 4 is a cross sectional view taken on the plane of line 4—4 of Figure 2, Figure 5 is a vertical sectional view taken at the connection of one of the wheels with the axle, Figure 6 is a horizontal sectional view taken on the line 6—6 of Figure 1, Figure 7 is a horizontal sectional view taken on the line 7—7 of Figure 1, and Figure 8 is a vertical sectional view taken on the line 8—8 of Figure 4.

Referring specifically to the drawings wherein like reference characters designate like or similar parts, a frame of a conventional tractor or similar vehicle is shown at 10, fragmentarily, having a vertical bolster or bearing 11 provided centrally at the front thereof, in which a vertical steering post or rod 12 is mounted for rotation by a hand wheel (not shown) from above or in any other suitable manner.

Removably disposed horizontally across the front of the tractor is an axle member 13. In order to rigidly connect such member 13, an outwardly and downwardly extending lug 14 is provided on the bearing 11, behind which the axle 13 intimately fits and is secured in place by means of a bolt or the like 15 passing through one of the openings 16 of said axle. Such openings permit lateral adjustment of said axle to a central position or to eccentric positions on either side thereof as proves most advantageous for the work in hand. A radius rod 17 extends from the tractor and is removably secured by nuts 18 in the adjacent openings 19 of series thereof, according to the position of the axle.

Said axle at each end has vertically spaced ears 20 mounting removable bolts or spindles 21 on which vertical bearings or knuckles 22 are journaled and which carry the front wheels 23. To this end, the axles and spindles 24 of the wheels have brackets 25 thereon, vertically disposed, of dove-tail form in cross section and generally of wedge shape, being wider at the bottom than at the top. The bearings 22 have slots or recesses 26 corresponding in shape to the heads or brackets 25 and the latter are detachably slidably applicable thereto, being held against removal by means of screw members 27 passing through the brackets or heads 25 and into the bearings 22.

Cranks 28 extend rearwardly from the bearings 22 and a cross rod 29 is detachably connected to them by vertical bolts at 30. A drag link 31 is pivotally connected at 32 to the cross rod 29 and at 33 is pivotally connected to a crank arm 34 which has an attaching head or bracket 35 of dovetail form in cross section and generally of wedge shape, being wider at the bottom than at the top. An externally tapered hub 36 is keyed at 37 removably to the lower end of the steering rod or shaft 12, being held in place thereon by a nut 38. This hub 36 is smaller at the bottom than at the top and at diametrically opposite sides has recesses therein at 39 which are wider at the bottom than at the top and are of dove-tail form in cross section. Said head or bracket 35 is removably disposed in one of the recesses 39 and in the bases thereof are screw threaded openings 40 similar to those at 41 in the bearings 22 which are adapted to receive a screw 42 passing through the bracket 35 and securing the same in one of the recesses.

Reverting to the pivotal connection 33, the drag link 31 extends into a sleeve 43 and is pivoted to a bolt 44 therein selectively applicable to openings of a series 45, according to the adjustment of the axle. The pivotal connection is preferably a ball 33 engaged in adjustable block members 46 constituting a socket therefor.

As a result of the construction described the wheels 23 may be steered through the turning of the steering shaft 12, and the action of the crank 34, drag link 31, cross rod 29, cranks 28, bearings 22 and spindles 24. In many instances, the wheels being self-steering where they travel furrows, thus relieving the operator.

Attention is called to the fact that the recesses 26 and 39 are similar in size and shape. This is true of the brackets or heads 25 and 35 and also of the screw threaded openings at 40 and 41 and the screws 27 and 42. As a result, the axle 13 and parts connected thereto may be removed when desired and the wheels fastened in the more advantageous position of Figure 3 according to the work in hand. In such position, it will be realized that the brackets or heads 25 are located in the recesses 39 with the screws 27 thereof being threaded into the openings 40.

Various additional objects and advantages may be resorted to provided they fall within the spirit and scope of the invention.

I claim as my invention:

1. A tractor of the class described having a steering post provided with a hub, an axle, bearings at the outer ends of said axle, means journaling the bearings on the axle, wheel spindles, a steering connection between said bearings and said post, means on said bearings and means on said hub for selective attachment of said wheel spindles to said bearings or said hub.

2. A tractor of the class described having a steering post provided with a hub, an axle, bearings at the outer ends of said axle, means journaling the bearings on the axle, wheel spindles, a steering connection between said bearings and said post, and means for selective attachment of said wheel spindles to said bearings or said hub, comprising recesses in said bearings and said hub, brackets on said spindles engageable in said recesses, and fastening elements passing through the brackets and engaging the adjacent parts.

3. A tractor of the class described having a steering post provided with a hub, an axle, bearings at the outer ends of said axle, means journaling the bearings on the axle, wheel spindles, a steering connection between said bearings and said post, and means for selective attachment of said wheel spindles to said bearings or said hub, comprising recesses in said bearings and said hub, and brackets on the spindles shaped to fit said recesses, said brackets and recesses decreasing in width in an upward direction.

4. A tractor of the class described having a steering post provided with a hub, an axle, bearings at the outer ends of said axle, means journaling the bearings on the axle, wheel spindles, a steering connection between said bearings and said post, means for selective attachment of said wheel spindles to said bearings or said hub, comprising recesses in said bearings and said hub, and brackets on the spindles shaped to fit said recesses, said brackets and recesses decreasing in width in an upward direction, and being of dove-tail shape in cross section.

5. A tractor of the class described having a steering post provided with a hub, an axle, bearings at the outer ends of said axle, means journaling the bearings on the axle, wheel spindles, a steering connection between said bearings and said post, means for selective attachment of said wheel spindles to said bearings or said hub, comprising recesses in said bearings and said hub, and brackets on the spindles shaped to fit said recesses, and being of dove-tail shape in cross section.

FRANK MADDEN.